United States Patent
Mathiesen et al.

(10) Patent No.: US 8,820,414 B2
(45) Date of Patent: Sep. 2, 2014

(54) FLOW CONTROL DEVICE AND FLOW CONTROL METHOD

(75) Inventors: Vidar Mathiesen, Porsgrunn (NO); Haavard Aakre, Skien (NO); Arne Valle, Porsgrunn (NO)

(73) Assignee: Statoil Petroleum ASA, Stavanger (NO)

( * ) Notice: Subject to any disclaimer, the term of this patent is extended or adjusted under 35 U.S.C. 154(b) by 518 days.

(21) Appl. No.: 13/147,102

(22) PCT Filed: Jan. 28, 2010

(86) PCT No.: PCT/NO2010/000032
§ 371 (c)(1),
(2), (4) Date: Oct. 12, 2011

(87) PCT Pub. No.: WO2010/087719
PCT Pub. Date: Aug. 5, 2010

(65) Prior Publication Data
US 2012/0031625 A1 Feb. 9, 2012

(30) Foreign Application Priority Data
Jan. 30, 2009 (NO) .................................. 20090494

(51) Int. Cl.
*E21B 34/06* (2006.01)
*F15D 1/02* (2006.01)
*G05D 7/01* (2006.01)
*F16L 55/027* (2006.01)
*E21B 43/12* (2006.01)
*E21B 34/08* (2006.01)

(52) U.S. Cl.
CPC . *E21B 34/08* (2013.01); *F15D 1/02* (2013.01);
*G05D 7/0146* (2013.01); *F16L 55/02736* (2013.01); *E21B 43/12* (2013.01)
USPC ........................................ 166/373; 166/332.1

(58) Field of Classification Search
USPC ........................................ 166/373, 386, 332.1
See application file for complete search history.

(56) References Cited

U.S. PATENT DOCUMENTS 6,058,787 A   5/2000   Hughes
7,239,967 B2 *  7/2007   Havre .............................. 702/50

FOREIGN PATENT DOCUMENTS

WO   WO 91/03781 A1   3/1991
WO   WO 2008/004875 A1   1/2008

* cited by examiner

*Primary Examiner* — William P Neuder
(74) *Attorney, Agent, or Firm* — Birch, Stewart, Kolasch & Birch, LLP

(57) ABSTRACT

The present invention relates to a method of improving flow stability for a multiphase fluid flowing through a tubular element (1), comprising arranging a flow control device (2) along a flow path (F) through the tubular element (1), the flow control device (2) comprising a housing (4), an inlet (10) arranged on an upstream side of the control device (2), an outlet (23, 13) arranged on a downstream side of the control device (2), and a movable body (9) provided within the housing (4) along an internal flow path (11) through the control device (2) from the inlet (10) to the outlet (23, 13), the body (9) being arranged such that changes in velocity and/or properties and/or composition of the fluid flowing along the internal flow path (11) result in changes to the forces acting on the body (9) as a result of the Bernoulli principle, thereby adjusting the flow of fluid through the control device (2).

18 Claims, 6 Drawing Sheets

FLOW CONTROL DEVICE AND FLOW CONTROL METHOD

The present invention relates to a flow control device and a flow control method. The present invention relates for example to production and reservoir technology as well as multiphase transport technology and, thus, how to achieve improved hydraulics or flow stability in the well pipeline. The present invention relates in particular but not exclusively to the use of a type of autonomous valve or flow control device for self-adjusting slug damping in a flow line.

Regarding slug damping, a lot of solutions have been presented in the existing technology and these include, for instance:
  passive choking of the topside chokes,
  controllers by using different sensors and electric/pneumatic controlled valves,
  slug-catchers or separators used as passive buffer volumes,
  riser base gas lift for multiphase flow lines, and
  variation of the steady state operating pressure, if the production system permits.

A summary presenting relevant technology is also to be found in the paper Valle A.; Utvik O. H.: "Field tests and analysis of hydrodynamic slugging in multiphase crude oil flow lines", Hydro ASA, Multiphase Production Technology Conference, Barcelona, 15-17 May 2005.

The main challenges using the existing technology could be specified as follows:
  i) gas-lift and installing buffer volumes imply relative high investment costs,
  ii) passive choking at topside reduces the production rates—the production potential is not utilized, and
  iii) controllers by using control valves and chokes are not stable and, therefore, they need to be followed up and frequent retuning is essential. Another disadvantage is their dependency on the available instrumentation.

For a relatively low number of installations variation on operating pressure is also possible but in a limited time window.

Figure 1:
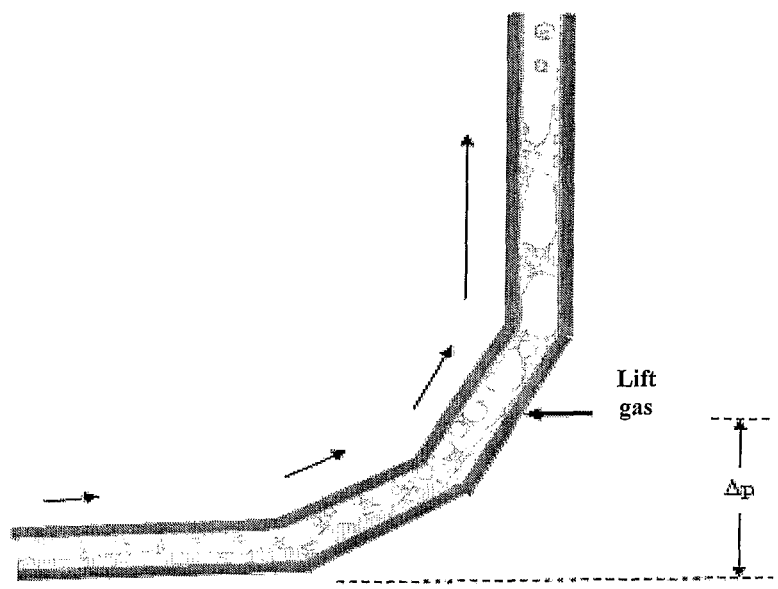
Figure 1:
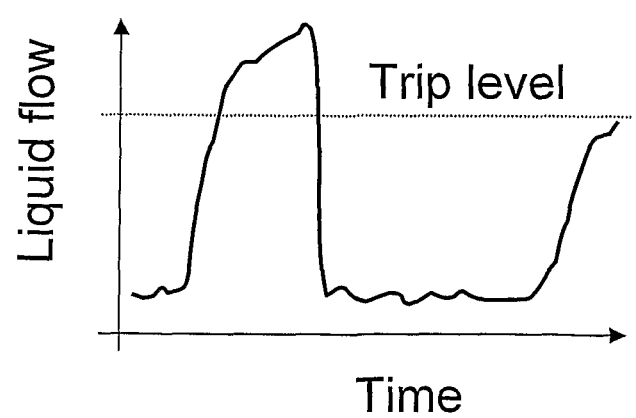

FIG. 1 of the accompanying drawings schematically shows some aspects of the main challenges mentioned above.

Based on the shortcomings discussed above, the present applicant has identified a need for a less complex and more reliable solution involving improved slug damping in a flow line, or in other words for improving flow stability for a multiphase fluid flowing through a tubular element. In such context the present applicant has identified ambitions for a solution having low topside investments and very low extra topside volumes by only using extra valves. Ideally, neither modifications upstream the topside choke nor shall extra instruments be needed. Further, it is desirable that no or a very small reduction in the liquid production rate is expected.

Surprisingly, the present applicant has determined that self-adjusting valves or flow controlling devices according to WO-A1-2008/004875, i.e. being autonomous in their function, could comply with the ambitions mentioned above and, thus, should be very useful in a flow line as a simple precaution against development of unwanted slugs.

Therefore, according to a first aspect of the present invention there is provided a method of improving flow stability for a multiphase fluid flowing through a tubular element. A flow control device is arranged along a flow path through the tubular element. The flow control device comprises a housing, an inlet arranged on an upstream side of the control device, and an outlet arranged on a downstream side of the control device. A movable body is provided within the housing along an internal flow path through the control device from the inlet to the outlet. The body is arranged such that changes in velocity and/or properties and/or composition of the fluid flowing along the internal flow path result in changes to the forces acting on the body as a result of the Bernoulli principle. This acts to adjust the flow of fluid through the control device. The applicant has found that, as a result, flow stability is improved.

According to a second aspect of the present invention there is provided a flow control device arranged in the flow path of a tubular element. The flow control device is provided to improve flow stability for a multiphase fluid flowing along the flow path. The flow control device comprises a housing, an inlet arranged on an upstream side of the control device, and an outlet arranged on a downstream side of the control device. A movable body is provided within the housing along an internal flow path through the control device from the inlet to the outlet. The body is arranged such that changes in velocity and/or properties and/or composition of the fluid flowing along the internal flow path result in changes to the forces acting on the body as a result of the Bernoulli principle. This acts to adjust the flow of fluid through the control device. The applicant has found that, as a result, flow stability is improved.

An embodiment of the present invention uses a self-adjustable valve or flow control device adapted to control the flow of fluid in a tubular element associated with a well formed in a subterranean reservoir, the valve or control device comprising an inlet or aperture, thereby forming a flow path through the valve or control device passing by a movable disc or body which is designed to move freely relative to the opening of the inlet and thereby reduce or increase the flow-through area by exploiting the Bernoulli effect and any stagnation pressure created over the disc, whereby the valve or control device, depending on the composition of the fluid and its properties, autonomously adjusts the flow of the fluid based on a pre-estimated flow design, wherein at least one such self-adjustable valve or control is arranged within the tubular element for self-adjusting slug damping by means of a reversed flow regime, the tubular element being in the form of a flow line above the well.

Favourable embodiments are to be understood from the dependent patent claims and the discussion below.

The advantage of such autonomous valves or flow controlling devices is the ability to increase the flow resistance when gas or low viscosity fluid passes therethrough and, if more viscous and denser fluid is passing, decrease the flow resistance. In other words a reversed flow regime is advantageously achieved. This helps to eliminate most of the gas expansion upstream of the choke and helps to eliminate or damp initiation of large slugs.

Such autonomous valves utilize the Bernoulli effect acting on a freely movable disc or body situated at a valve seat arranged in connection with a flow path through the valve as to "invert" the response compared to a conventional valve. The autonomous Bernoulli valves open for liquid dominated fluid and choke the gas dominated fluids.

For a conventional choke, the flow resistance for gas dominated fluids is typically an order of magnitude lower compared to a liquid dominated fluid. This difference generates high expansion of the gas zones after a slug has passed through the choke and new slugs are forming in the upstream pipeline or tubing.

As a consequence, the potential for long slugs upstream the topside choke is reduced and more stable flow will exist in the upstream production system. This is similar to what happens when the operating pressure is reduced as discussed in the referred paper above. However, the variation of pressure is in general limited.

The specific advantages of the present invention can be summarized as follows:

Low topside investments. Very low extra topside volumes. Only extra valves are needed.

No modifications upstream the topside choke are needed.

No extra instruments are needed.

No or very small reduction in the liquid production rates.

Figure 2:
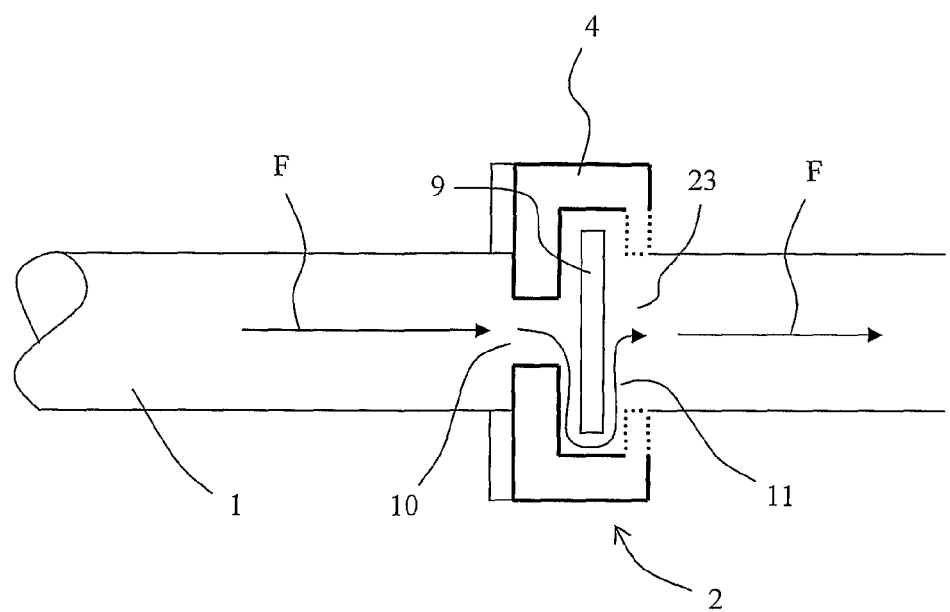
Figure 3A:
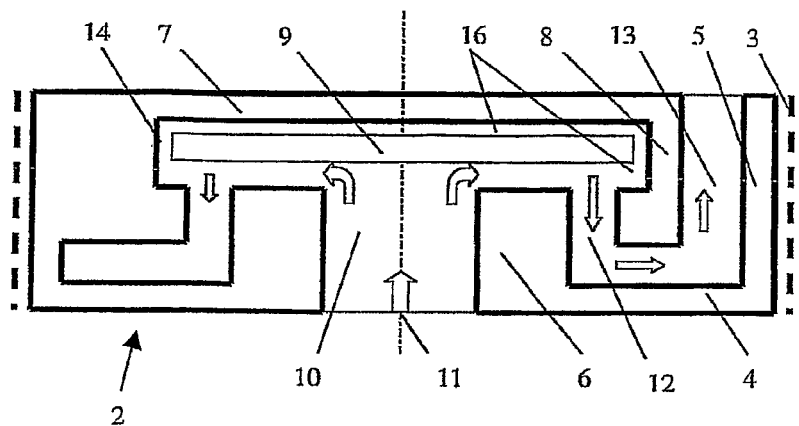
Figure 4:
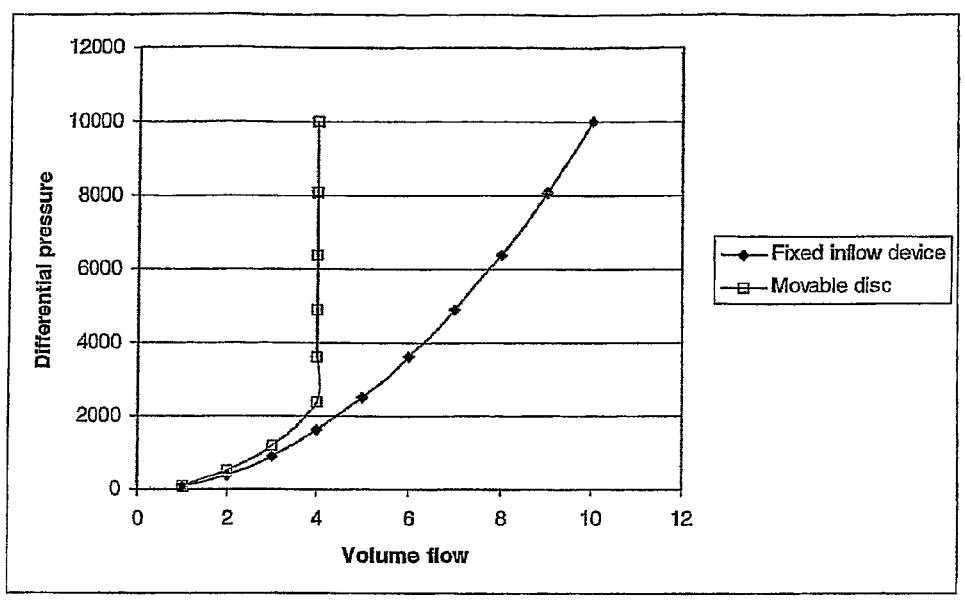
Figure 5:
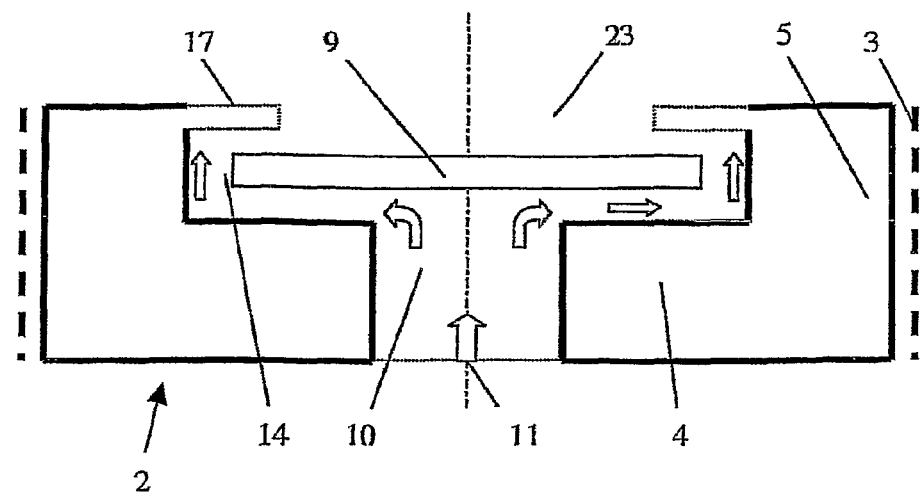
Figure 6:
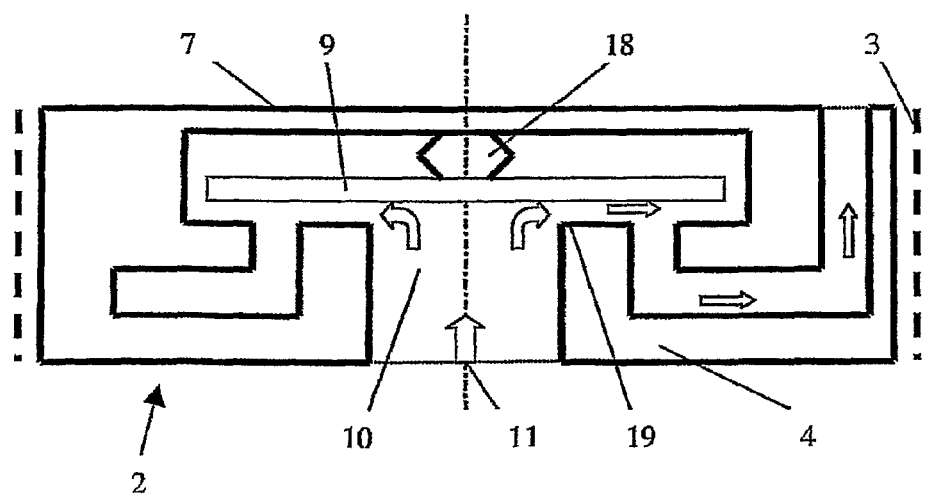
Figure 7:
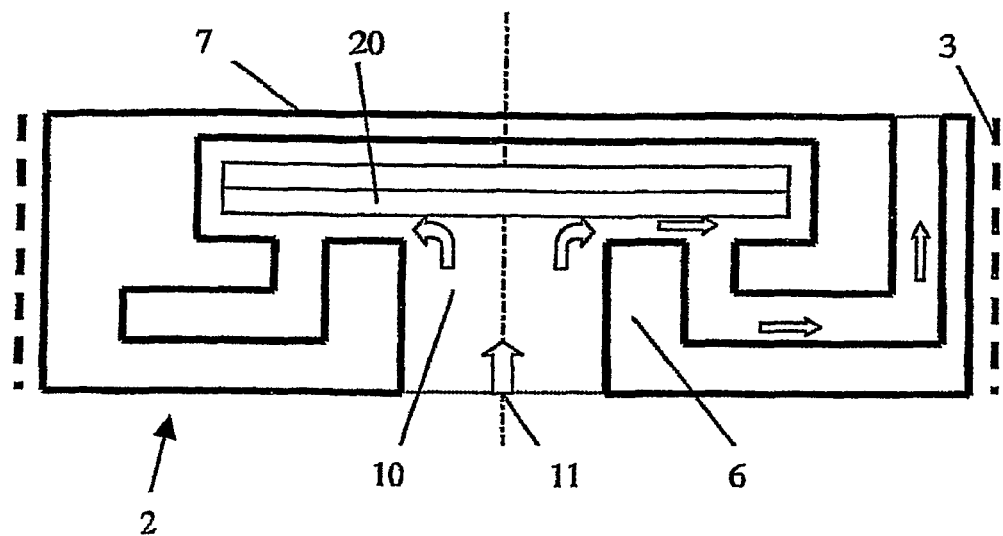

Reference will now be made, by way of example, to the accompanying drawings, in which:

FIG. 1 schematically shows some aspects of the main challenges mentioned above;

FIG. 2 schematically shows a view of a flow line including a self-adjustable valve or flow control device controlling fluid within the flow line;

FIG. 3 a-b schematically shows in larger scale a cross-section and top view of the present valve or flow control device, respectively;

FIG. 4 shows a diagram illustrating the flow volume through the present valve or flow control device vs. the differential pressure compared to a fixed inflow device;

FIGS. 5 to 7 schematically show further embodiments of the present valve or flow control device.

As already mentioned above, and referring to FIG. 2, the present invention relates to the use of at least one self-adjustable valve or flow control device 2 adapted to control the flow of fluid within a flow line (or tubular element) 1 associated with a well formed in a subterranean reservoir, thereby helping to eliminate most of the gas expansion upstream the choke and, thus, helping to eliminate or reduce (damp) initiation of large slugs. Compared with traditional solutions having a fixed opening, a valve or flow control device 2 as used in an embodiment of the present invention increases the flow resistance when gas or low viscosity fluid passes therethrough and, if more viscous and denser fluid is passing, the flow resistance decreases. In other words, a reversed flow regime is provided, with the control device 2 offering a flow resistance which depends inversely on the viscosity of the fluid flowing through the control device 2, at least for a predetermined range of viscosities. Moreover, the valve or flow control device also has the function illustrated in FIG. 4 involving for all phases a "cut off" at high flow rates (maximum volume flow).

In most cases it should be sufficient to include just one valve or flow control device 2 in the flow line 1 but, if needed, more such valves or flow control devices 2 could be added. It should be noted that FIG. 2 only depicts a very schematic view of an arrangement including the present valve or flow control device 2 and its connection to the flow line 1. It is understood that the valve or flow control device 2 could be attached in any appropriate manner. For a better understanding of how to construct the valve or flow control device 2, reference is made in particular to FIGS. 3 to 7 and the description thereof which shall be interpreted in an illustrative and not restrictive manner; the reader is also referred to WO-A1-2008/004875, which describes a flow control device upon which the present invention is based. The respective valve or flow control device 2 could be placed at a subsea template, for instance, or at a platform below and over the mainly vertical portion of the flow line 1, respectively, or therebetween, and even a combination thereof is a possibility.

The present valve or flow control device 2 as depicted in FIG. 2 is based on that disclosed in WO-A1-2008/004875, and is helpful for improving flow stability for a multiphase fluid flowing through a tubular element 1. The flow control device 2 is arranged along a flow path F through the tubular element 1, and includes an inlet or aperture 10 arranged on an upstream side of the control device 2, and an outlet 23 arranged on a downstream side of the control device 2. An internal flow path 11 is defined through the flow control device 2 from the inlet 10 to the outlet 23, passing by a movable disc or body 9 provided within a housing 4 of the flow control device 2. The movable disc or body 9 is designed to move freely relative to the opening of the inlet and thereby reduce or increase the flow-through area by exploiting the Bernoulli effect and any stagnation pressure created over the disc or body 9, whereby the valve or flow control device 2, depending on the composition of the fluid and/or its properties and/or its velocity, autonomously adjusts the flow of the fluid into the flow line 1 based on a pre-estimated flow design. In this respect, changes in velocity and/or properties and/or composition of the fluid flowing along the internal flow path 11 result in changes to the forces acting on the body 9 as a result of the Bernoulli principle, thereby affecting and adjusting the flow of fluid through the flow control device 2.

Figure 3B:
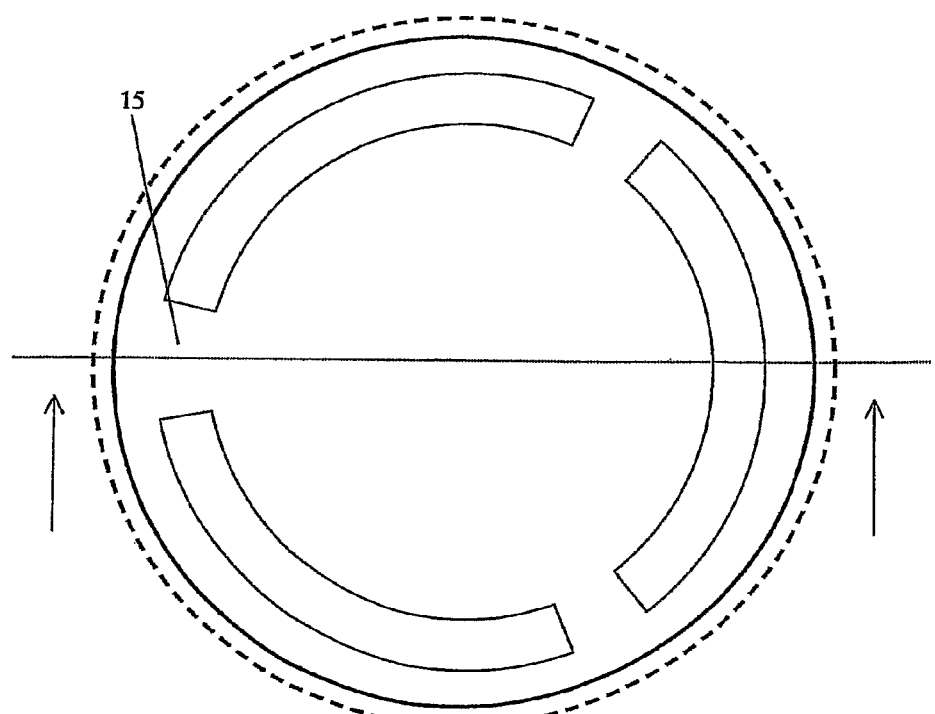

As already mentioned above, an embodiment of the present invention is based on a valve or flow control device ("control device" hereinafter) disclosed in WO-A1-2008/004875 and, therefore, it is considered appropriately to give a comprehensive review of the control device with reference to FIG. 3 a-b showing the control device 2 in detail. Advantageously, the control device 2 consists of a first disc-shaped housing body 4 with an outer cylindrical segment 5 and inner cylindrical segment 6 and with a central hole or aperture 10, and a second disc-shaped holder body 7 with an outer cylindrical segment 8, as well as a freely movable and preferably flat disc or body 9 arranged in an open space 14 formed between the first and second disc-shaped housing and holder bodies 4, 7. The body 9 can for particular applications and adjustments depart from the flat shape and have a partly conical or semicircular shape, for instance towards the aperture 10. The cylindrical segment 8 of the second disc-shaped holder body 7 fits within the flow line 1 and protrudes in the opposite direction of the outer cylindrical segment 5 of the first disc-shaped housing body 4 thereby forming a flow path as shown by the arrows 11, where the fluid enters the control device through the central hole or aperture 10, i.e. the inlet and flows towards and radially along the disc 9 before flowing through the annular opening 12 formed between the cylindrical segments 8 and 6 and further out through the annular opening 13 formed between the cylindrical segments 8 and 5. The two disc-shaped housing and holder bodies 4, 7 are attached to one another by a screw connection, welding or other means, not further depicted in the figures, at a connection area 15, see in FIG. 3b. It is understood that the outer segment 5, and the respective segment in the embodiments to be depicted below not necessarily has to abut the inner surface of the flow line 1, provided an intermediate element, not shown, is present therebetween.

The control device exploits the effect of Bernoulli teaching that the sum of static pressure, dynamic pressure and friction is constant along a flow line:

$$p_{static} + \frac{1}{2}\rho v^2 + \Delta p_{friction}$$

When subjecting the disc 9 to a fluid flow, which is the case with the present control device, the pressure difference over the disc 9 can be expressed as follows:

$$\Delta p_{over} = [p_{over(P_4)} - p_{under(p_1,p_2,p_3)}] = \frac{1}{2}\rho v^2$$

Due to lower viscosity, a fluid such as gas will "make the turn later" and follow further along the disc towards its outer end 14. This makes a higher stagnation pressure in the area 16 at the end of the disc 9, which in turn makes a higher pressure over the disc. The disc 9 being freely movable within the space between the disc-shaped bodies 4, 7 will move downwards and thereby narrow the flow path between the disc 9 and inner cylindrical segment 6. Thus, the disc 9 moves downwards or upwards, depending on the viscosity of the fluid flowing through, whereby this principle can be used to control i.e. close or open the flow of fluid through of the control device.

Further, the pressure drop through a traditional inflow control device (ICD) with fixed geometry will be proportional to the dynamic pressure:

$$\Delta p = K \cdot \frac{1}{2}\rho v^2$$

where the constant, K is mainly a function of the geometry and less dependent on the Reynolds number.

In the control device according to WO-A1-2008/004875 the flow area decreases when the differential pressure increases, such that the volume flowing through the control device not, or nearly not, increases when the pressure drop increases. A comparison between such a control device having movable disc and a control device with fixed flow-through opening is shown in FIG. 4 and, as illustrated. The flow-through volume for the present control device is constant above a given differential pressure.

FIG. 5 shows a schematic representation of another embodiment of the control device according to WO-A1-2008/004875, which is of a more simple design than the version depicted in FIG. 3. The control device 2 consists, as with the version depicted in FIG. 3, of a first disc-shaped housing body 4 with an outer cylindrical segment 5 and with a central hole or aperture 10, and a second disc-shaped holder body 17 attached to the segment 5 of the housing body 4, as well as a preferably flat disc 9 provided in an open space 14 formed between the first and second disc-shaped housing and holder bodies 4, 17. However, since the second disc-shaped holder body 17 is inwardly open through a hole or holes 23, etc. and is now only holding the disc in place, and since the cylindrical segment 5 is shorter with a different flow path than what is shown in FIG. 3, there is no build up of stagnation pressure on the back side of the disc 9 as explained above in conjunction with FIG. 4. With this solution without stagnation pressure the building thickness for the device is lower and can withstand a larger amount of particles contained in the fluid.

FIG. 6 shows a third embodiment according to WO-A1-2008/004875 where the configuration is the same as with the example shown in FIG. 3 but in which a spring element 18, in the form of a spiral or other suitable spring device, is provided on either side of the disc and connects the disc with the holder 7, 22, recess 21 or housing 4.

The spring element 18 is used to balance and control the inflow area between the disc 9 and the inlet 10, or rather the surrounding edge or seat 19 of the inlet 10. Depending on the spring constant and thereby the spring force, the opening between the disc 9 and edge 19 will thus be larger or smaller, and with a suitable selected spring constant, depending on the inflow and pressure conditions at the selected place where the control device is provided, constant mass flow through the device can be obtained.

FIG. 7 shows a fourth embodiment according to WO-A1-2008/004875 having a configuration as depicted in FIG. 6 above but in which the disc 9, on the side facing the inlet opening 10, is provided with a thermally responsive device such as bi-metallic element 20.

In the arrangement depicted in FIG. 2, the flow control device is arranged such that substantially all of the fluid flowing along the flow path F passes through the control device 2. It will be appreciated that this need not necessarily be the case, because some benefit would be obtained if only part of the flow is diverted through the flow control device 2.

It can be seen that the flow control device 2 of the above-described embodiments has a substantially disc-like shape and is positioned with its axis in a direction substantially parallel with a longitudinal axis of the tubular element 1. Again, this is not necessarily the case, and other shapes and arrangements would be readily apparent to the skilled person.

In the above-described embodiments, the body 9 is arranged within an open space or cavity 14 provided within the housing 4 along the internal flow path 11 between the inlet 10 and the outlet 23. In the arrangement shown in FIGS. 2 and 5, the inlet 10, cavity 14 and outlet 23 are arranged substantially in line in a direction along a longitudinal axis of the tubular element 1. However, this is not essential, as shown by the alternative embodiments depicted in FIGS. 3a, 6 and 7.

In each of the embodiments, a cross-sectional area of the open space 14 is greater than a cross-sectional area of the inlet 10 and a cross-sectional area of the outlet 13, 23, though this is not essential. At least in the FIGS. 2 and 5 embodiments, the cross-sectional area of the inlet 10 is smaller than a cross-sectional area of the outlet 23. In the FIG. 2 arrangement it can be seen that the cross-sectional area of the outlet 23 is substantially the same as the cross-sectional area of the tubular element 1; this is achieved by having at least part of the housing 4 of the flow control device 2 protrude outside the tubular element 1.

Although the main focus of the above description has been a situation where the multiphase fluid being carried by the tubular element 1 comprises multiphase crude oil, with the tubular element (1) forming part of a well pipeline or a flow line above a well, it will be appreciated that an embodiment of the present invention will also find use in improving flow stability in a multiphase fluid in other situations. It will also be appreciated that the flow control device of the present invention is not limited to those designs as depicted in the accompanying drawings and as described above; modifications are possible within the scope of the appended claims. In particular, the skilled person will appreciate that it would be possible to use self-adjusting valves disclosed elsewhere that operate according to the principles as set out above and in the appended claims.

When producing oil the conditions can rapidly change from a situation wherein only or mostly oil is produced to a situation wherein no oil is produced. With for instance a pressure drop of 16 bar from 100 bar the temperature drop would correspond to approximately 20° C. By providing the disc 9 with a thermally responsive element such as a bi-metallic element as shown in FIG. 7, the disc will bend upwards or be moved upwards by the element 20 abutting the holder shaped body 7 and thereby narrowing the opening between the disc and the inlet 10 or fully closing said inlet.

The invention claimed is:

1. A method of improving flow stability for a multiphase fluid flowing through a tubular element, comprising
   arranging a flow control device along a flow path within the tubular element, wherein the flow control device is positioned with an axis thereof in a direction substantially parallel with a longitudinal axis of the tubular element, the flow control device comprising:
a housing;
an inlet arranged within the tubular element on an upstream side of the flow control device;
an outlet arranged within the tubular element on a downstream side of the flow control device; and
a movable body provided within the housing along an internal flow path through the flow control device from the inlet to the outlet, the body being arranged such that changes in any of velocity, properties and/or composition of the fluid flowing along the internal flow path result in changes to the forces acting on the body as a result of the Bernoulli principle, thereby adjusting the flow of fluid through the flow control device.

2. The method as claimed in claim 1, comprising arranging the flow control device such that substantially all of the fluid flowing along the tubular element passes through the flow control device.

3. The method as claimed in claim 1, wherein the changes to the forces acting on the body as a result of the Bernoulli principle cause a flow-through area along the internal flow path to reduce or increase, thereby adjusting the flow of fluid through the flow control device.

4. The method as claimed in claim 1, wherein the changes to the forces acting on the body as a result of the Bernoulli principle cause the flow control device to offer a flow resistance which depends inversely on the viscosity of the fluid flowing through the flow control device, thereby providing a reversed flow regime.

5. The method as claimed in claim 1, wherein the flow control device has a substantially disc-shape form.

6. The method as claimed in claim 1, wherein the body is arranged within an open space provided within the housing along the internal flow path between the inlet and the outlet.

7. The method as claimed in claim 6, wherein the inlet, open space and outlet are arranged substantially in line in a direction along the longitudinal axis of the tubular element.

8. The method as claimed in claim 6, wherein a cross-sectional area of the open space is greater than a cross-sectional area of the inlet and a cross-sectional area of the outlet.

9. The method as claimed in claim 1, wherein a cross-sectional area of the inlet is smaller than a cross-sectional area of the outlet.

10. The method as claimed in claim 1, wherein a cross-sectional area of the outlet is substantially the same as a cross-sectional area of the tubular element.

11. The method as claimed in claim 1, wherein the multiphase fluid comprises multiphase crude oil and the tubular element forms part of a well pipeline or a flow line above a well.

12. A flow control device arranged in the flow path of a tubular element, the flow control device being positioned with an axis thereof in a direction substantially parallel with a longitudinal axis of the tubular element, the flow control device being arranged within the tubular element for improving flow stability for a multiphase fluid flowing along the flow path, and comprising: a housing, an inlet arranged within the tubular element on an upstream side of the flow control device, an outlet arranged within the tubular element on a downstream side of the flow control device, and a movable body provided within the housing along an internal flow path through the flow control device from the inlet to the outlet, the body being arranged such that changes in any of velocity properties and composition of the fluid flowing along the internal flow path result in changes to the forces acting on the body as a result of the Bernoulli principle, thereby adjusting the flow of fluid through the flow control device.

13. A use of a self-adjustable valve or flow control device adapted to control the flow of fluid in a tubular element associated with a well formed in a subterranean reservoir, the valve or flow control device comprising an inlet or aperture, thereby forming a flow path through the valve or flow control device passing by a movable disc or body which is designed to move freely relative to the opening of the inlet and thereby reduce or increase the flow-through area by exploiting the Bernoulli effect and any stagnation pressure created over the disc, whereby the valve or flow control device, depending on the composition of the fluid and its properties, autonomously adjusts the flow of the fluid based on a pre-estimated flow design, wherein at least one such self-adjustable valve or flow control device is arranged within the tubular element for self-adjusting slug damping by means of a reversed flow regime, the tubular element being in the form of a flow line above the well,
wherein the valve or flow control device is positioned with an axis thereof in a direction substantially parallel with a longitudinal axis of the flow line.

14. The use according to claim 13, wherein each of the valves or flow control devices consists of first disc-shaped body with an outer cylindrical segment and inner cylindrical segment and with the central aperture, and a second disc-shaped body with an outer cylindrical segment, as well as a basically flat disc provided between the first and second disc-shaped bodies, whereby the cylindrical segment of the second disc-shaped body fits within and protrudes in the opposite direction of the outer cylindrical segment of the first disc-shaped body, thereby forming the flow path where the fluid enters the valve or flow control device through the central aperture or inlet flowing towards and along the disc before flowing through an annular opening formed between the cylindrical segments and further out through the annular opening formed between the cylindrical segments.

15. The use according to claim 14, wherein a spring is provided between one side of the disc and connects the disc with a holder, recess or housing.

16. The use according to claim 14, wherein the disc on the side facing the aperture is provided with a thermally responsive device.

17. The use according to claim 16, wherein the thermally responsive device is a bi-metallic element.

18. The use according to claim 13, wherein the inlet or aperture is arranged on an upstream side of the valve or flow control device, wherein the movable disc or body is arranged within an open space provided within a housing of the valve or flow control device, the open space being arranged along the flow path through the valve or flow control device from the inlet or aperture to an outlet arranged on a downstream side of the valve or flow control device.

* * * * *